United States Patent Office 3,260,665
Patented July 12, 1966

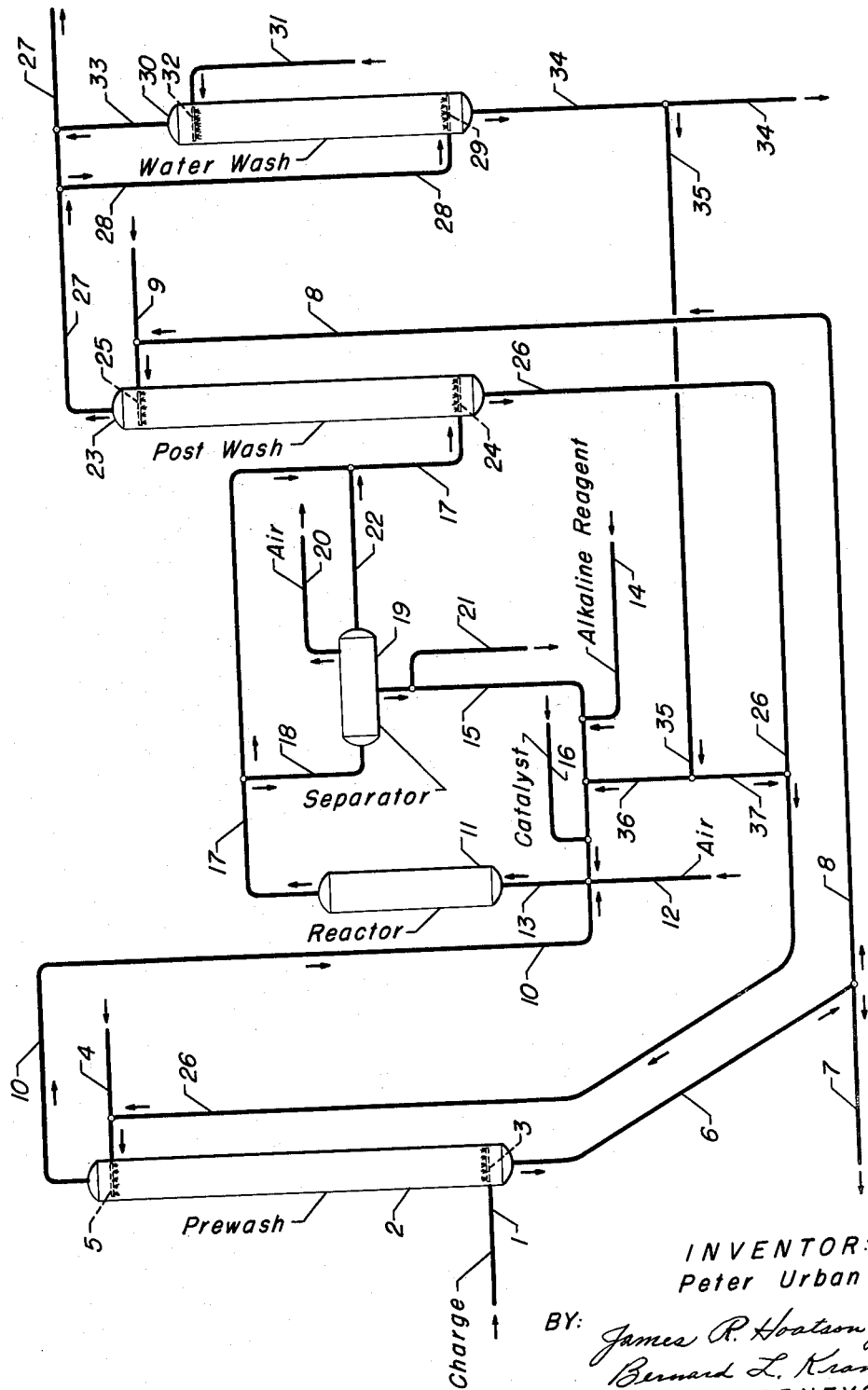

3,260,665
OXIDATION OF DIFFICULTLY OXIDIZABLE MERCAPTANS
Peter Urban, Northbrook, Ill., assignor to Universal Oil Products Company, Des Plaines, Ill., a corporation of Delaware
Filed Oct. 23, 1964, Ser. No. 405,927
5 Claims. (Cl. 208—206)

This application relates to a novel method for the oxidation of difficultly oxidizable mercaptan fractions.

A recently developed process for the oxidation of mercaptans utilizes a phthalocyanine catalyst. This process is very effective for the oxidation of mercaptans but does suffer the disadvantage of comparatively low catalyst life when utilized for the oxidation of mercaptan fractions containing both difficultly oxidizable mercaptans and toxins for the catalyst. This is generally exemplified for example, in the sweetening of heavy hydrocarbon fractions containing toxins for the catalyst. The term sweetening is used herein in the meaning accepted in the industry to describe the oxidation of a mercaptan-containing fraction to produce a treated product containing a reduced concentration of mercaptans as compared to the untreated fraction. By heavy hydrocarbons, I mean hydrocarbons higher boiling than gasoline, and includes particularly kerosene, jet fuel, diesel fuel, solvent oil, stove oil, range oil, burner oil, gas oil, fuel oil, etc. In general the kerosene will have an initial boiling point of from about 300° to about 450° F. and an end boiling point of from about 475° to about 550° F. Solvent oil and stove oil, for example, usually have an initial boiling point within the range of from about 350° to about 500° F. and an end boiling point of from about 525° to about 600° F. The higher boiling fractions normally contain a greater variety of components than are contained in lower boiling fractions. Included in these various components are difficultly oxidizable mercaptans and in many cases compounds which appear to detrimentally affect the life of the phthalocyanine catalyst and are referred to herein as toxins.

As hereinbefore set forth, the phthalocyanine catalyst is very effective for the sweetening of light hydrocarbon distillates, the light hydrocarbon distillates including sour normally gaseous hydrocarbon fractions, sour gasoline, sour naphtha, etc. Accordingly, there generally is no need for the more complicated process of the present invention. However, when the hydrocarbon fraction contains difficultly oxidizable mercaptans and catalyst toxins, the novel combination process of the present invention offers the advantage of improved sweetening of the sour hydrocarbon fraction and of long catalyst life. While the process of the present invention is particularly applicable for the sweetening of sour heavy hydrocarbon fractions, it is understood that it also may be used for the oxidation of a concentrated mercaptan fraction containing difficultly oxidizable mercaptans and catalyst toxins.

The invention is further described in connection with the accompanying diagrammatic flow drawing which illustrates several specific embodiments of the invention.

In one embodiment the present invention relates to a process for oxidizing in the presence of a phthalocyanine catalyst a difficultly oxidizable mercaptan fraction containing toxins for said catalyst, which comprises prewashing said mercaptan fraction with an alkaline reagent-alcohol solution to remove at least a portion of said toxins from said mercaptan fraction, separately recovering from said prewashing an alkaline reagent-alcohol solution containing toxins and a mercaptan fraction reduced in toxins, subjecting said mercaptan fraction to oxidation by reaction with an oxidizing agent in the presence of said phthalocyanine catalyst, separating therefrom an oxidized mercaptan fraction, and postwashing the same with at least a portion of said alkaline reagent-alcohol solution containing toxins.

In a specific embodiment the present invention relates to a combination process for sweetening in the presence of a phthalocyanine catalyst sour heavy hydrocarbon distillate containing toxins for said catalyst, which comprises prewashing said hydrocarbon distillate with a caustic-methanol solution to remove at least a portion of said toxins from said hydrocarbon distillate, separately recovering from said prewashing a caustic-methanol solution containing toxins and a hydrocarbon distillate reduced in toxins, subjecting said sour hydrocarbon distillate to sweetening by reacting mercaptans contained therein with air in the presence of said phthalocyanine catalyst, separating therefrom a sweetened hydrocarbon distillate, and postwashing the same with at least a portion of said caustic-methanol solution containing toxins.

Referring to the hereinbefore specific embodiment, it will be noted that the toxins contained in the sour hydrocarbon distillate are removed in the prewash step, thereby leaving a washed hydrocarbon distillate reduced in catalyst toxins. The washed hydrocarbon distillate will contain methanol dissolved therein and this offers the additional advantage of the improved benefits obtained in effecting the sweetening in the presence of methanol. Following the sweetening reaction, the treated hydrocarbon distillate will also contain dissolved methanol or methanol entrained in the distillate. The postwash treatment serves to recover at least a portion of the methanol from the sweetened hydrocarbon distillate and at the same time will serve to transfer at least a portion of the toxins from the caustic-methanol solution back into the sweetened hydrocarbon distillate. The toxins, while harmful to the phthalocyanine catalyst, apparently are not objectionable in the treated hydrocarbon distillate. Thus, it will be seen that the combination of the prewash, sweetening and postwash, in which the same caustic-methanol solution is used in both of the washing steps, provides a mutually related and interdependent combination of steps to produce important advantages in the sweetening of sour heavy hydrocarbon distillates in the presence of the phthalocyanine catalyst.

In accordance with the present invention the charge which, as hereinbefore set forth, may comprise concentrated difficultly oxidizable mercaptans containing catalyst toxins or a heavy hydrocarbon fraction containing catalyst toxins, is first given a prewash with an alkaline reagent-alcohol solution. Any suitable alkaline reagent may be employed. A preferred alkaline reagent comprises an alkali metal hydroxide such as sodium hydroxide (caustic), potassium hydroxide, etc. Other alkaline reagents include lithium hydroxide, rubidium hydroxide, cesium hydroxide, etc., although, in general, these hydroxides are more expensive and therefore are not preferred for commercial use. As hereinbefore set forth, an alcohol solution of the alkaline reagent is employed. Methanol is particularly preferred as the alcohol. Other alcohols include ethanol, propanol, butanol, etc. In another embodiment the alcohol comprises a glycol, including ethylene glycol, propylene glycol, butylene glycol, etc., or a diol including propane diol, butylene diol, etc.

The make-up of the alkaline reagent-alcohol solution for use in the prewash step will depend upon the particular concentrated mercaptan fraction or sour hydrocarbon distillate being charged to the process. As will be hereinafter explained in connection with the description of the drawing, the present process offers great flexibility in varying the alkaline reagent-alcohol solution in response to the particular toxins or other impurities in the charge to the process. In general, the alkaline reagent-alcohol solution will comprise from about 5% to about 50% by weight of alkaline reagent, from about 5% to about 40% by weight of alcohol and from about 10% to about 90% by weight of water. A more specific range comprises from about 25% to about 45% by weight of alkaline reagent, from about 15% to about 35% by weight of alcohol and from about 20% to about 60% by weight of water.

As hereinbefore set forth, the prewash step of the process serves the dual function of removing objectionable catalyst toxins from, and of transferring alcohol to, the charge to the process. Both of these functions improve the oxidation or sweetening step of the process to which the prewashed charge is now supplied.

As hereinbefore set forth, the oxidation or sweetening is effected in the presence of a phthalocyanine catalyst. Any suitable phthalocyanine catalyst may be used and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine, in general, is not readily soluble in aqueous solvent, and therefore, when used in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any source or prepared in any suitable manner as, for example, by reacting cobalt or vanadium phthalocyanine with 25-50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

The phthalocyanine catalyst may be utilized either as a solution or suspension in a suitable alkaline medium or as a fixed bed in a reaction zone. When utilized as a solution or suspension in an alkaline reagent, conveniently the alkaline reagent is selected from those hereinbefore set forth in connection with the prewash treatment. A preferred alkaline solution for the oxidation or sweetening is an aqueous solution of from about 1% to about 50% and more particularly from about 5% to about 25% by weight concentration of sodium hydroxide or potassium hydroxide. As hereinbefore set forth, the oxidation or sweetening advantageously is effected in the presence of alcohol and particularly methanol. When desired, all or a portion of the alcohol may be introduced into the alkaline solution or suspension prior to introduction into the reaction zone. However, because of the flexibility of the present combination process, the amount of alcohol introduced into the oxidation reaction will be correlated with the amount of alcohol entrained or dissolved in the charge during the prewash treatment and carried thereby into the reaction zone. In general, the amount of alcohol present in the reaction zone will comprise from about 5% and preferably from about 15% to about 30% by weight of the alkaline reagent solution.

In another embodiment, the phthalocyanine catalyst is utilized as a fixed bed in the oxidation or sweetening zone. In this embodiment, the catalyst is prepared as a composite with a solid support. Any suitable support may be employed and preferably comprises activated charcoal, coke or other suitable forms of carbon. In some cases the support may comprise silica, alumina, magnesia, etc. or mixtures thereof. The solid catalyst is prepared in any suitable manner. In one method, preformed particles of the solid support are soaked in a solution containing the phthalocyanine catalyst, after which excess solution is drained off and the catalyst is used as such or is subjected to a drying treatment, mild heating, blowing with air, hydrogen, nitrogen, etc., or successive treatments using two or more of these treatments prior to use. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.1% to 10% by weight or more of the composite. When the catalyst is used as a fixed bed, in one embodiment it may be pretreated with an alkaline solution which may or may not contain alcohol. In another embodiment an alkaline solution which may or may not contain alcohol is continuously or intermittently introduced into the oxidation or sweetening zone during processing.

Regardless of which system is used, the oxidized mercaptan or sweetened hydrocarbon fraction will contain dissolved alcohol. The loss of this alcohol in the treated product may prove economically prohibitive. As one advantage of the present invention, the oxidized or sweetened product is given a postwash with the alkaline reagent-alcohol solution used in the prewash. This serves to recover at least a portion of the alcohol from the treated product. As hereinbefore set forth, the postwash also serves to transfer at least a portion of the catalyst toxins into the treated product and thereby serves to regenerate the alkaline reagent-alcohol solution for further use in the prewash system. Thus, the present process provides a mutually related and interdependent combination of steps to provide improved operation as hereinbefore described.

The invention will now be explained with reference to the accompanying flow diagrammatic drawing. In the interest of simplicity, the description of the drawing will be directed to the treatment of a sour kerosene and to the use of caustic-methanol solution in the prewash system. It is understood that other sour hydrocarbon distillates and concentrated mercaptan fractions, as well as other alkaline reagent-alcohol solutions may be used as hereinbefore set forth.

Referring to the drawing, the sour kerosene charge is introduced through line 1 into prewash tower 2 preferably through a suitable distributing device illustrated at 3. In prewash zone 2, the charge is intimately contacted with a caustic-methanol solution introduced through line 4 to zone 2, preferably through a suitable distributing device illustrated at 5. In the case here illustrated, zone 2 comprises a continuous countercurrent contact system. It is understood that zone 2 may contain suitable contacting devices including bubble trays, bubble decks, side to side pans, etc., and/or mixing devices including rotating blades, etc. In another embodiment the caustic-methanol solution may be disposed as a body of liquid in the lower portion of zone 2 and the sour kerosene charge is passed therethrough, in which case suitable mixing means such as rotating blades or other suitable devices may be employed.

Regardless of the particular type of prewash employed, the prewashed kerosene charge will be reduced in catalyst toxins but will contain dissolved methanol. The caustic-methanol solution containing toxins is withdrawn from the lower portion of zone 2 through line 6 and, while a portion may be removed from the process through line 7, at least a portion thereof is passed by way of lines 8 and 9 to the postwash system as will be hereinafter described.

In the case here illustrated, the prewashed kerosene is withdrawn through line 10 from the upper portion of zone 2 and is subjected to sweetening in reactor 11. Oxidation of mercaptans contained in the prewashed kerosene is effected by reacting the mercaptans with a suitable oxidizing agent. Air is preferred as the oxidizing agent, although oxygen or other suitable oxygen-containing gas may be employed. As hereinbefore set forth, the particular operation of reactor 11 will depend upon whether the catalyst is used in suspension in the caustic solution or whether the catalyst is disposed as a fixed bed in the reaction zone. Regardless of which particular method is used, the prewashed kerosene is reacted with air or other oxidizing gas in the presence of the phthalocyanine catalyst, methanol and preferably alkaline solution.

Referring to the drawing, air or other oxidizing gas is introduced through line 12, to commingle with the prewashed kerosene being passed through line 10, and the mixture is passed through line 13 into reactor 11. When caustic solution is supplied, continuously or intermittently into reactor 11, the caustic solution may be introduced to the process through line 14 and/or recycled by way of line 15, to be commingled with the prewashed kerosene and air. Similarly, when additional phthalocyanine catalyst is to be supplied to reactor 11, the catalyst is introduced through line 16 and passed by way of lines 15 and 13 into reactor 11. When the catalyst is employed as a suspension, it is used in a concentration of from about 5 to 1000 and preferably from about 20 to about 500 parts per million by weight of the alkaline solution. In either case of catalyst being used in suspension or as a fixed bed, it may be desirable to add additional catalyst, either continuously or intermittently, during the process and this may be done by way of line 16. It is understood that the caustic solution, catalyst and/or air may be supplied directly to reactor 11 in any suitable manner.

In the case here illustrated the mixture introduced through line 13 is passed upwardly through reactor 11. It is understood that downward flow may be used when desired and also that reactor 11 may contain suitable contacting devices including side to side pans, bubble trays, bubble decks, etc., rotating mixing blades, etc., or that the reaction zone may comprise a series of orifice plates. All that is required is that intimate contact of the sour kerosene, air, catalyst, methanol and caustic solution is obtained so that maximum oxidation of mercaptans is accomplished. The sweetening is effected at any suitable temperature, which may range from ambient to about 200° F. when operating at atmospheric pressure or up to about 400° F. when operating at superatmospheric pressure. In general it is preferred to utilize a temperature of from about 100° to about 175° F. Atmospheric or superatmospheric pressure, which may range up to 1000 pounds or more, may be used.

As hereinbefore set forth, removal of the toxins from the sour kerosene serves to prolong the life of the phthalocyanine catalyst and results in maximum oxidation of the difficultly oxidizable mercaptans. This also results in a reduction in the discoloration of the kerosene which otherwise occurs. Without intended to be limited thereto, it may be that the discoloration at least in part may result from the toxins contained in the kerosene which, in turn, may be related to the deactivation of the catalyst.

Regardless of the particular method used in the sweetening reaction, the treated kerosene will contain dissolved methanol and may contain other non-hydrocarbons in addition to the disulfides formed in the oxidation. For example, when the liquid type operation is used in zone 11, the effluent will comprise kerosene, disulfides, caustic solution, catalyst, methanol and excess air. In this method the mixture is withdrawn, in the case here illustrated, from the upper portion of reactor 11 through line 17 and is passed through line 18 into separator 19. In separator 19 excess air is vented from the system through line 20. Caustic solution containing phthalocyanine catalyst and a portion of the methanol is withdrawn through line 15 from separator 19 and is recycled, at least in part, by way of lines 15 and 13 to reactor 11 for further use in the process. When desired, a portion of the caustic solution may be withdrawn from the process through line 21.

The sweetened kerosene which, as hereinbefore set forth, will contain dissolved or entrained methanol is withdrawn from separator 19 by way of line 22 and is passed through line 17 into postwash zone 23. When reactor 11 is operated with the catalyst disposed as a fixed bed and without the presence of caustic solution, the sweetened kerosene may be passed directly through line 17 into postwash zone 23, or when caustic solution is used, the effluent from reactor 11 is passed into separator 19, from which the kerosene is passed to zone 23. Zone 23 may contain internal contacting devices as heretofore described in connection with zone 2. In zone 23, the kerosene is passed into contact with at least a portion of the caustic-methanol solution from prewash zone 2. Methanol contained in the treated kerosene is dissolved in the caustic-methanol solution and thereby is recovered for further use in the process. Toxins contained in the caustic-methanol solution from zone 2 are transferred, at least in part, to the treated kerosene and this serves to regenerate the caustic-methanol solution for further use in removing toxins from the sour kerosene charge. The caustic-methanol solution is withdrawn from zone 23 through line 26 and is returned by way of line 26 and 4 to prewash zone 2 for further use in the process. When desired, additional caustic-methanol solution may be supplied to zone 23 by way of line 9.

The sweetened kerosene now reduced in methanol is withdrawn from zone 23 by way of line 27 and may be recovered as the product of the process. However, after a considerable period of operation, the sweetened kerosene withdrawn through line 27 may contain increasing amounts of methanol. When desired, the sweetened kerosene may be passed by way of lines 27 and 28 to water wash tower 30, preferably through distributing device 29, wherein the treated kerosene is passed upwardly into contact with a descending stream of water introduced through line 31, preferably through distributing device 32. The treated kerosene now further substantially reduced in methanol content is withdrawn from zone 30 through line 33 as the desired product of the process. Water containing methanol is withdrawn from the lower portion of zone 30 through line 34 and may be removed from the process. As hereinbefore set forth, the methanol-water stream may be used to provide the desired composition of caustic-methanol solutions in either prewash zone 2 or reactor 11. Accordingly, the water-methanol stream may be passed through lines 34 and 35 and distributed all or in part by way of lines 36, 15 and 13 to reactor 11 or by way of lines 37, 26 and 4 to prewash zone 2.

From the description of the drawing, it will be seen that the composition of the caustic-methanol solution in zone 2 may be varied and selected in response to the particular sour hydrocarbon distillate and the particular type of toxins contained therein. For example, certain toxins are better removed by means of a strong caustic solution, while other toxins are better removed when using a dilute caustic solution. Therefore, the particular caustic solution will be selected with regard to the particular type of toxins present in the sour kerosene charge.

Without intended to be limited thereto it is believed that the toxins may be of the phenolic type, the naphthenic acid type, or other oxygen-containing compounds. Regardless of this, the process of the present invention provides flexibility in that the compositions of the solutions in the washing and sweetening zones may be varied readily to suit the particular requirements in each zone. For example, the caustic-methanol composition in the washing zones will reach equilibrium but, after long periods of service, will change in composition. A portion of the caustic-methanol solution may be withdrawn either through lines 7 and 34 and replaced by additional caustic, water and/or methanol, as required, by way of lines 4 and 31. In general it is necessary to introduce methanol either into the washing steps by way of lines 4 and 31, or into the reaction step by way of line 14. As hereinbefore set forth, the methanol will travel, at least in part, from prewash zone 2 into reactor 11 and be recovered, to a substantial extent, in postwash zone 23. It is preferred that the caustic-methanol solution in reactor 11 is independently selected for best results in the oxidation reaction, but will be determined with regard to the amount of methanol introduced therein by entrainment or solution in the prewashed sour kerosene.

While only one prewash zone is illustrated in the drawing, it is understood that two or more prewash zones may be employed and when desired, the caustic-methanol solutions used in each of the zones may be of different compositions. Also when desired, two or more postwash zones and/or water wash steps may be employed.

As a particular advantage of the present process, the toxins are removed from the sour kerosene charge before the same is contacted with the phthalocyanine catalyst and thereby avoids the deactivation of the catalyst which otherwise occurs. In the postwash, the toxins, at least in part, are transferred back into the sweetened kerosene. As hereinbefore set forth, these toxins are not harmful in the sweetened kerosene. The postwash thus serves the dual function of returning the toxins back to the sweetened kerosene and of removing them from the caustic-methanol, thereby regenerating the latter for further use in the prewash step of the process.

In the interest of simplicity, heat exchangers, valves, coolers and similar appurtenances have been omitted from the drawing and will be provided as required. Also, it is understood that suitable contacting means, including distributing devices similar to 3 and/or 5 may be provided in reactor 11.

The following examples are introduced to illustrate further the novelty and utility of the present invention but not with the intention of unduly limiting the same.

*Example I*

The kerosene used in this example is a commercial kerosene having a boiling range of from about 348° to about 548° F., a mercaptan sulfur content of about 550 parts per million and a Saybolt color of 28.

When the above kerosene without prewash is subjected to sweetening in the presence of a solid bed of cobalt phthalocyanine sulfonate catalyst deposited on activated carbon and in the presence of aqueous 8% caustic solution to produce a sweetened product containing less than 20 parts per million of mercaptan sulfur, the life of the catalyst will be less than about 300 barrels of kerosene per pound of phthalocyanine catalyst. When the sweetening is effected in the same manner except for the addition of 10% by volume of methanol, based upon the caustic solution, the life of the catalyst will be about 600 barrels of kerosene per pound of phthalocyanine catalyst. In contrast, when the sour kerosene is given a prewash with caustic-methanol solution containing 40% by weight of sodium hydroxide, 20% by weight of methanol and 40% by weight of water and then is subjected to sweetening in the same manner as described above, the life of the catalyst will be increased to about 3000 barrels per pound of phthalocyanine catalyst.

*Example II*

The sour kerosene described in Example I is subjected to treatment in a combination process of the present invention as follows. The sour kerosene is passed into prewash tower 2 into contact with caustic-methanol solution initially containing 40% by weight of sodium hydroxide, 20% by weight of methanol and 40% by weight of water. The prewashed kerosene then is subjected to sweetening in the presence of cobalt phthalocyanine catalyst and caustic-methanol solution originally containing 10% by weight of sodium hydroxide, 10% by weight of methanol and the remainder water. This is accomplished by passing the sour kerosene, caustic-methanol solution and air at 75° F. upwardly through a fixed bed of cobalt phthalocyanine sulfonate deposited on activated charcoal. The effluent from reactor 11 is passed to separator 19 wherefrom excess air is vented to the atmosphere and sweetened kerosene is separated from caustic-methanol solution. The caustic-methanol solution is recycled to reactor 11, and the treated kerosene is given a postwash with the caustic-methanol solution withdrawn from the prewash zone. The sweetened and washed kerosene is now substantially reduced in methanol but contains toxins dissolved therein. The caustic-methanol from the postwash is reduced in toxins but increased in methanol and is reused in the prewash step of the process.

As the operation continues, the balance of methanol in the system may change due to increased recovery of the methanol introduced into the sweetening step of the process. When this occurs, the methanol content of the sweetened kerosene from the postwash step also will increase and, in such case, the sweetened kerosene is water washed in the manner hereinbefore described to recover the methanol. After a long period of operation, the caustic-methanol solution used in the prewash step may become overburdened with toxins and, in such case, at least a portion of the caustic-methanol is withdrawn from the system and replaced by fresh caustic-methanol. Here again, the specific concentrations of caustic and methanol to be introduced at one or more points in the system will be selected with regard to the overall concentrations of caustic and methanol in the system and carry-over thereof from one step of the process to another step of the process.

*Example III*

The sour kerosene of this example is a commercial kerosene having a boiling range of from about 327° to about 517° F., a mercaptan sulfur content of about 103 parts per million and a Saybolt color of 26.

The sour kerosene is first given a prewash with caustic-methanol solution initially containing 35% by weight of potassium hydroxide, 15% by weight of methanol and 50% by weight of water. The prewash is accomplished by countercurrent contact of the sour kerosene and the potassium hydroxide-methanol solution. The prewashed kerosene then is subjected to sweetening in the presence of vanadium phthalocyanine sulfonate catalyst by being commingled with air, potassium hydroxide solution containing 8% by weight of potassium hydroxide, 30% by weight of methanol, water and 100 parts per million by weight of vanadium phthalocyanine sulfonate. The mixture is passed at a temperature of 100° F. upwardly through a reaction zone containing side to side pans. The effluent from the reaction zone is passed to a separator, wherefrom excess air is vented from the system, potassium hydroxide solution containing methanol and phthalocyanine catalyst is separated and is recycled to the reaction zone, and a sweetened kerosene containing methanol is withdrawn and passed into postwash with the potassium hydroxide-methanol solution withdrawn from the prewash. The postwash is accomplished by passing the sweetened kerosene into the lower portion of zone 23 to contact the potassium hydroxide-methanol solution introduced into the upper portion of this zone. The postwashed kerosene is withdrawn from the upper portion of zone 23, is sweet to the doctor test and has a Saybolt color of 24.

I claim as my invention:

1. A combination process for oxidizing in contact with phthalocyanine catalyst a hydrocarbon fraction containing difficultly oxidizable mercaptans and toxins for said catalyst, which comprises prewashing said hydrocarbon fraction with an aqueous solution containing from about 5% to about 50% by weight of an alkali metal hydroxide and from about 5% to about 40% by weight of alcohol to remove at least a portion of said toxins from said fraction, said difficultly oxidizable mercaptans contained in said fraction being substantially insoluble in said solution, separating the resultant solution containing toxins from the hydrocarbon fraction reduced in toxins and containing a portion of said alcohol, subjecting the separated alcohol-containing hydrocarbon fraction of reduced toxin content to oxidation in contact with said catalyst, and postwashing the resultant oxidized fraction with at least a portion of said solution containing toxins to recover at least a portion of the alcohol content of said oxidized fraction and to regenerate said solution.

2. A combination process for oxidizing in contact with phthalocyanine catalyst a hydrocarbon fraction containing difficultly oxidizable mercaptans and toxins for said catalyst, which comprises prewashing said hydrocarbon fraction with an aqueous solution containing from about 5% to about 50% by weight of caustic and from about 5% to about 40% by weight of methanol to remove at least a portion of said toxins from said fraction, said difficultly oxidizable mercaptans contained in said fraction being substantially insoluble in said solution, separating the resultant solution containing toxins from the hydrocarbon fraction reduced in toxins and containing a portion of said methanol, subjecting the separated methanol-containing hydrocarbon fraction of reduced toxin content to oxidation by reaction with air in contact with said catalyst, and postwashing the resultant oxidized fraction with at least a portion of said solution containing toxins to recover at least a portion of the methanol content of said oxidized fraction and to regenerate said solution.

3. A combination process for the sweetening in contact with phthalocyanine catalyst a sour heavy hydrocarbon distillate containing difficultly oxidizable mercaptans and toxins for said catalyst, which comprises prewashing said distillate with an aqueous solution containing from about 5% to about 50% by weight of an alkali metal hydroxide and from about 5% to about 40% by weight of alcohol to remove at least a portion of said toxins from said distillate, said difficultly oxidizable mercaptans contained in said distillate being substantially insoluble in said solution, separating the resultant solution containing toxins from sour hydrocarbon distillate reduced in toxins and containing a portion of said alcohol, subjecting the separated alcohol-containing sour distillate of reduced toxin content to oxidation in contact with said catalyst, and postwashing the resultant sweetened distillate with at least a portion of said solution containing toxins to recover at least a portion of the alcohol content of the sweetened distillate and to regenerate said solution.

4. A combination process for the sweetening in contact with phthalocyanine catalyst a sour heavy hydrocarbon distillate containing difficultly oxidizable mercaptans and toxins for said catalyst, which comprises prewashing said distillate with an aqueous solution containing from about 5% to about 50% by weight of caustic and from about 5% to about 40% by weight of methanol to remove at least a portion of said toxins from said distillate, said difficultly oxidizable mercaptans contained in said distillate being substantially insoluble in said solution, separating the resultant solution containing toxins from sour hydrocarbon distillate reduced in toxins and containing a portion of said methanol, subjecting the methanol-containing sour distillate of reduced toxin content to oxidation with air in contact with said catalyst, and postwashing the resultant sweetened distillate with at least a portion of said solution containing toxins to recover at least a portion of the methanol content of the sweetened distillate and to regenerate said solution.

5. The process of claim 4 further characterized in that said heavy hydrocarbon distillate is sour kerosene.

References Cited by the Examiner

UNITED STATES PATENTS

| | | | |
|---|---|---|---|
| 2,152,721 | 4/1939 | Yabroff | 208—234 |
| 2,431,770 | 12/1947 | Payne et al. | 208—234 |
| 2,437,348 | 3/1948 | Brown et al. | 208—232 |
| 2,572,519 | 10/1951 | Richards et al. | 208—234 |
| 2,575,989 | 11/1951 | Arundale et al. | 208—207 |
| 2,882,224 | 4/1959 | Gleim et al. | 208—207 |
| 3,159,570 | 12/1964 | Petty | 208—207 |

DELBERT E. GANTZ, *Primary Examiner.*

PAUL M. COUGHLAN, *Examiner.*

R. H. SHUBERT, *Assistant Examiner.*